Figure 1:
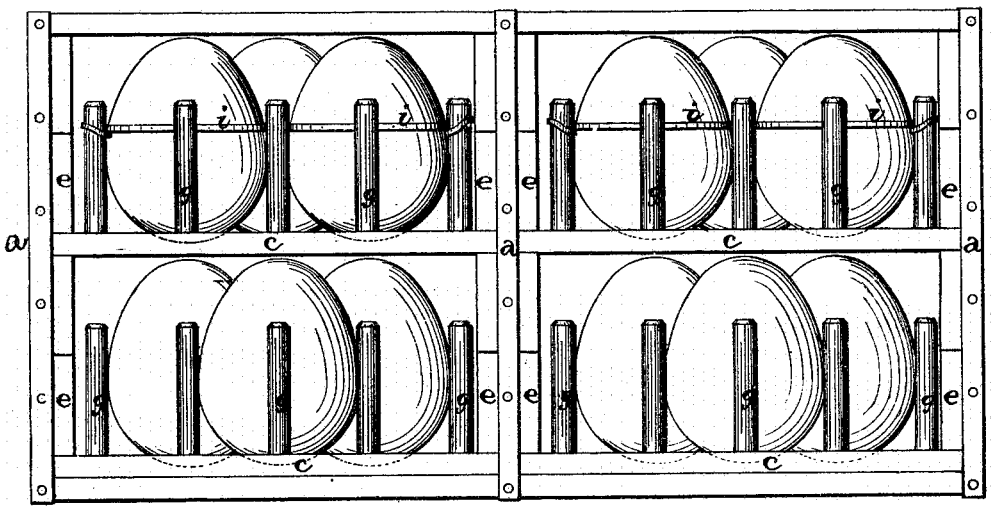
Figure 2:
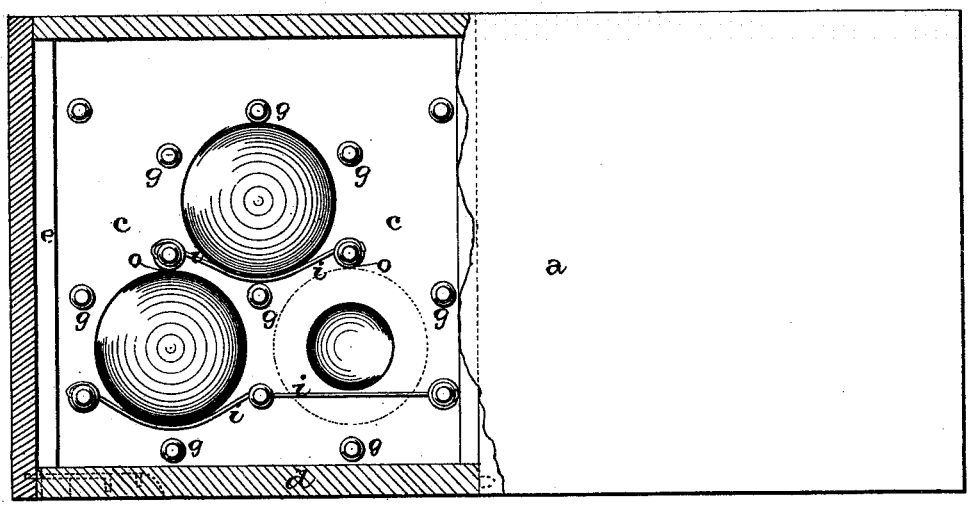

A. R. SPROUT.
EGG-CARRIER.

No. 185,794. Patented Dec. 26, 1876.

WITNESSES:
Wm Garner
F. M. Burnham

INVENTOR:
A. R. Sprout
per
F. A. Lehmann, Atty.

UNITED STATES PATENT OFFICE.

A. RENSSELAER SPROUT, OF PICTURE ROCKS, PENNSYLVANIA.

IMPROVEMENT IN EGG-CARRIERS.

Specification forming part of Letters Patent No. 185,794, dated December 26, 1876; application filed December 2, 1876.

*To all whom it may concern:*

Be it known that I, A. RENSSELAER SPROUT, of Picture Rocks, in the county of Lycoming and State of Pennsylvania, have invented certain new and useful Improvements in Egg-Carriers; and I do hereby declare the following to be a full, clear, and exact description of the invention, such as will enable others skilled in the art to which it pertains to make and use it, reference being had to the accompanying drawings, which form part of this specification.

My invention relates to an improvement in egg-carriers; and it consists in the arrangement and combination of pegs and rubber bands or cords attached thereto, as will be more fully described hereinafter, whereby each egg is held securely in its position, and prevented from being broken.

The accompanying drawings represent my invention.

*a* represents a suitable box-like frame, into which the trays or egg boards *c* slide in and out, like drawers, and which are held in position by means of the removable doors *d*. The boards *c* have a strip of board, *e*, nailed on each end, which serve to hold them securely in the frame, and slight depressions in its top, to receive one end of each egg, so as to hold them more safely in a vertical position. Projecting upward from the top of these boards to a suitable distance, and arranged in circles around the said depressions, are pegs or pins *g*. The circles formed by these pegs are considerably larger than ordinary-sized eggs, so that eggs of all sizes can be placed in them and allowed a slight movement without being too rigidly held. Tied to the pegs, wrapped around, or passing through holes in their upper ends, are rubber strings or bands *i*, which serve to hold the eggs gently, yet firmly, in place. These strings or bands are wrapped or tied around the upper ends of one row of pegs, so that that part which passes around the side of the pegs shall form a sort of a cushion at *o*, against which one side of the egg rests. The next band or string is stretched across the board, being tied at each end to a peg, and is made to pass through one side of each circle, in which is placed an egg. In thus passing through the circles the bands make them so small that an egg cannot be inserted without pushing the band to one side, and the part of the band thus pushed aside becomes a spring to force the egg over against the cushion at *o*, and thus hold the egg securely in position.

By the above-described arrangement of pegs and rubber bands or strings no ordinary amount of handling or rough usage will ever break or displace an egg during transportation.

Having thus described my invention, I claim—

In an egg-carrier, a board or tray, provided with the pegs *g* and bands or strings *i*, substantially as shown.

In testimony that I claim the foregoing, I have hereunto set my hand this 25th day of November, 1876.

A. RENSSELAER SPROUT.

Witnesses:
  JAMES LAIRD,
  W. L. LAIRD.